Aug. 11, 1942.　　　　C. C. BELL　　　　2,292,558
MACHINE FOR APPLYING CEMENT TO SHOE PARTS
Filed Feb. 19, 1941　　　2 Sheets-Sheet 1

INVENTOR:

Aug. 11, 1942.   C. C. BELL   2,292,558
MACHINE FOR APPLYING CEMENT TO SHOE PARTS
Filed Feb. 19, 1941   2 Sheets-Sheet 2

INVENTOR:
Charles C. Bell
By his attorney

Patented Aug. 11, 1942

2,292,558

UNITED STATES PATENT OFFICE 2,292,558

MACHINE FOR APPLYING CEMENT TO SHOE PARTS

Charles C. Bell, Marblehead, Mass., assignor to United Shoe Machinery Corporation, Flemington, N. J., a corporation of New Jersey Application February 19, 1941, Serial No. 379,690

13 Claims. (Cl. 12—80)

This invention relates to a machine for coating shoe parts by means of a spray gun and, as illustrated herein, is directed more particularly to an improved machine for applying a spray coating of adhesive to channeled insoles and having an improved support for the spray gun.

In one method of shoemaking, a lip is formed on the flesh side of the insole to which the upper is subsequently attached. In order to strengthen this lip and to reinforce the insole where it is of a somewhat flimsy nature, a canvas strip is cemented to the surface of the lip and a portion of the insole inwardly of the lip. The canvas strip is generally coated with an adhesive, and to insure a more perfect bond, it is also desirable to precoat with adhesive the inside of the lip and channel of the insole adjacent to the lip, as by spraying the adhesive progressively along the margin of the insole. In machines previously employed difficulty has been experienced as the dimensions and character of the work pieces changed because of the danger of getting the adhesive on the outside of the lip or upon parts of the machine, and it is, therefore, an object of the invention to provide an improved shoe part coating machine embodying a work feeding mechanism and a support for the spray gun which will permit movement thereof in substantially any direction with respect to said feeding mechanism so that the application of adhesive to the work may be accurately controlled.

To effect the application of adhesive to the inner surfaces of the lip and the channel of an insole, for example, with a minimum of waste of adhesive, the nozzle of the spray gun, as illustrated, is disposed with its end directed approximately at the corner between the lip and channel. Since the discharge from the spray gun is approximately conical or fan-shaped the distance between the end of the nozzle and the surface to be coated determines the width of the band of adhesive, which should be substantially equal to the width of the reinforcing strip. Once this distance is fixed for a particular width of reinforcing strip, it will still at times be desirable to shift the direction of the sprayed material so that the widths on opposite sides of the corner may be varied according to the height of the lip and the width of the insole inwardly thereof which is to be reinforced. Provision should also be made to shift the direction of the sprayed material so that no part thereof is projected onto the feed rolls. Accordingly, a feature of the invention resides in means for supporting the spray gun for tilting movement about the end of its nozzle as a center in a plurality of planes at right angles to each other, whereby the direction of the spray with respect to the work handling mechanism may be changed without varying the distance between the end of the gun and the surface of the work.

In order to provide for complete freedom of adjustment, it is also desirable to shift the spray gun bodily with respect to the surface of the work. Another feature of the invention, therefore, lies in an improved construction of the supporting means for the spray gun to the end that, as illustrated, the gun may be tilted about the end of its nozzle as a center and may be moved bodily in a rectilinear direction with respect to the work feeding mechanism.

The invention will now be described with reference to the accompanying drawings, in which Fig. 1 is a side elevation of the entire machine showing the gun and bracket mounted thereon;

Figure 1:
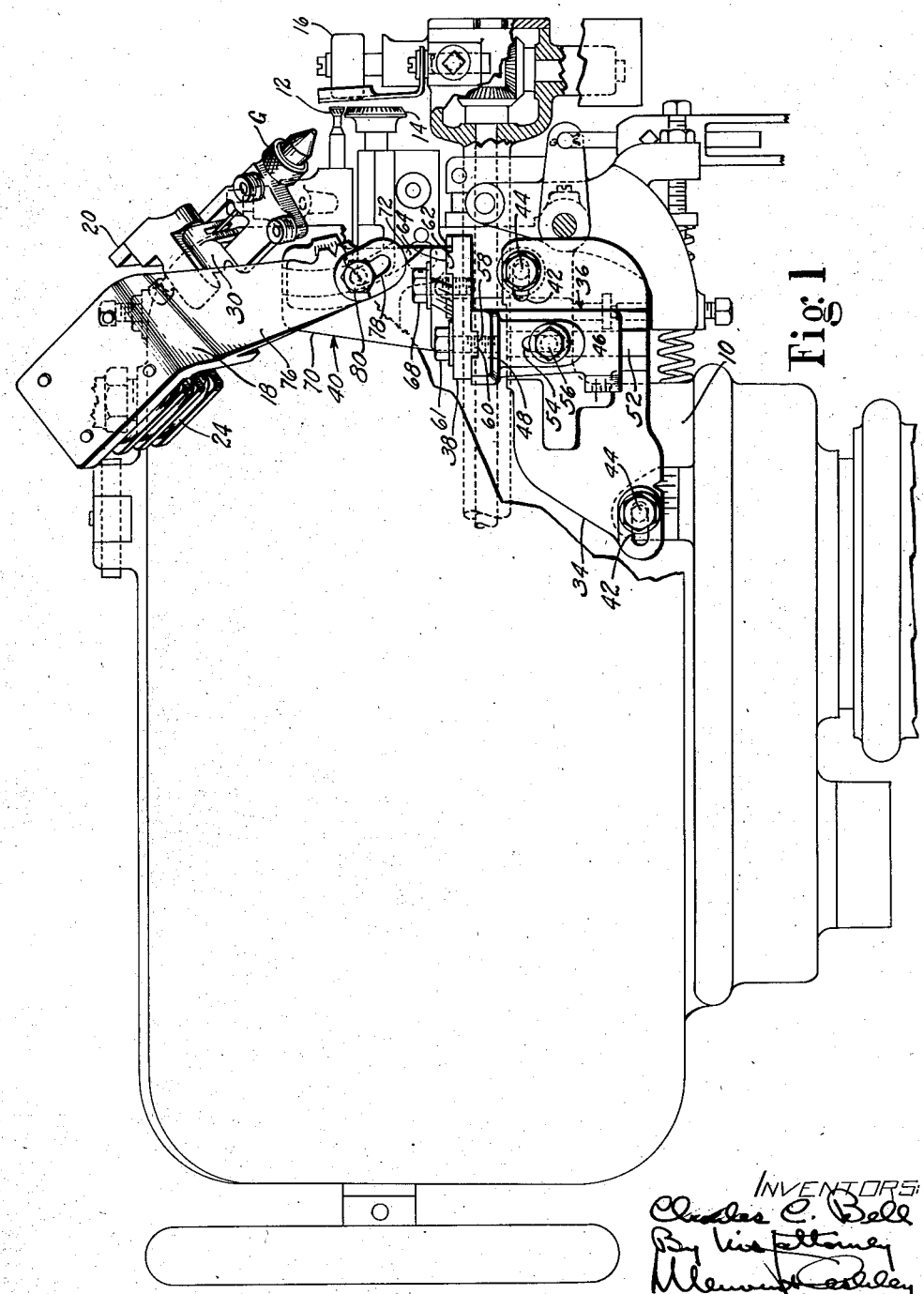
Figure 3:
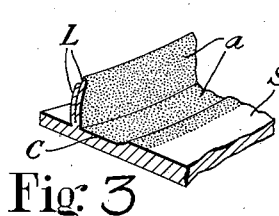
Fig. 3 is an angular view, on a larger scale, of a fragment of an insole showing the area to which the adhesive is applied.
Figure 2:
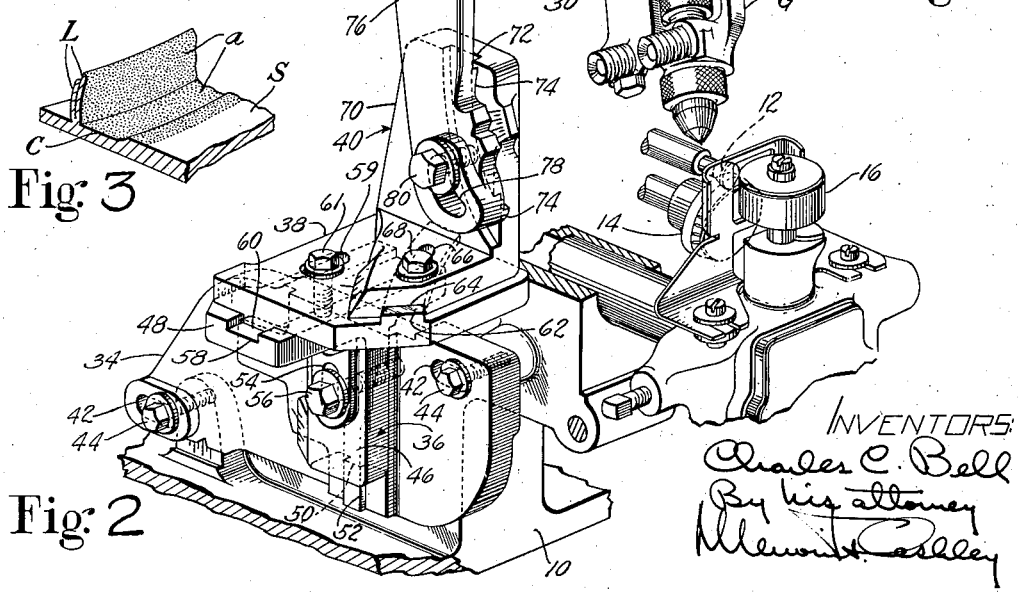
Fig. 2 is an angular view of the spray gun and its support.

The machine illustrated herein is adapted to apply latex or cement to an insole S, shown in Fig. 3, having a lip L formed on its flesh surface. The band of adhesive applied is indicated at $a$ and covers the inside of the lip, the channel $c$, and a portion of the flesh surface of the insole, as indicated in stippling. The machine, which is of the type disclosed and described in United States Letters Patent No. 1,726,800, granted September 3, 1929, on an application filed in the name of Frederick E. Bertrand, embodies work feeding mechanism, a spray gun, and an improved support for adjustably holding the spray gun in a position adjacent to the feed rolls (Figs. 1 and 2). The feeding mechanism which is carried by a frame 10, as illustrated, consists of feed rolls 12, 14 and 16 adapted to feed the insole lengthwise upon its edge, as shown in Fig. 4, the rolls 12 and 14 engaging the opposite sides of the lip and the roll 16 engaging the grain side of the insole.

Figure 4:
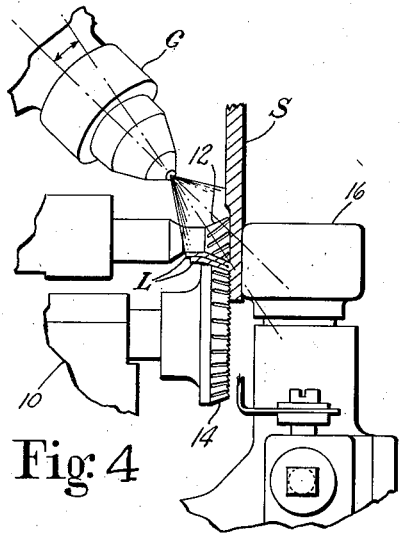
Fig. 4 is a side elevation of the operating rolls of the lip setting machine showing the angular position of the spray gun with respect to an insole gripped by said rolls.
Figure 5:
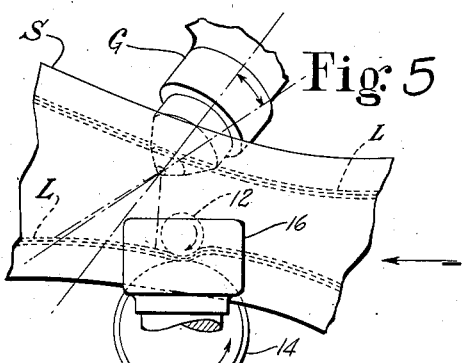
Fig. 5 is a front elevation viewed from the right side of Fig. 4 showing the angular position of the spray gun with respect to the feed rolls.
Figure 6:
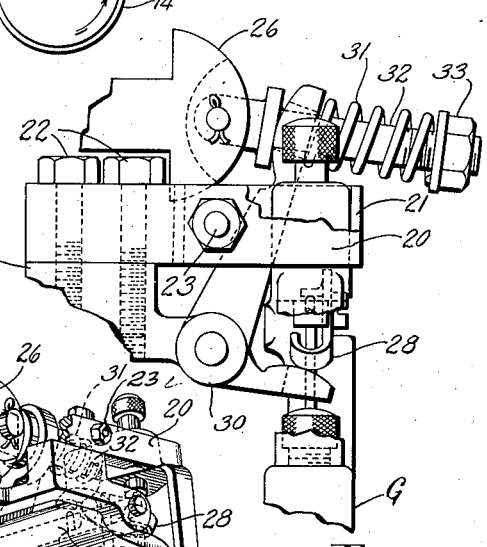
Fig. 6 shows the connection between the spray gun and a trigger operating solenoid.

As illustrated, the spray gun G is mounted so that its nozzle projects downwardly from above the upper roll 12 toward the corner between the inner surface of the lip and the channel of the insole, as shown in Figs. 1 and 4, so that a coating of adhesive may be applied to the insole at each side of the corner. The spray gun is also sloped so that its nozzle points to one side of the roll 12, as shown in Fig. 5, to prevent a deposit of adhesive on the feed rolls. The spray gun is held in this position upon a U-shaped support 18 by means of clamping members 20 and 21 (Fig. 6), the member 20 being bolted to the support 18 at 22. The clamping member 21 is directly back of the member 20 and is drawn into gripping relation to the spray gun by a bolt 23. A solenoid 24 is mounted on the U-shaped support 18 and its plunger 26 is connected to a trigger 28 of the spray gun by means of a bell-crank lever 30 and a pivoted bolt 32. Since the movement necessary to trip the trigger is very small, a spring 31 is disposed on the bolt 32 between one end of the bell-crank lever 30 and a nut 33 screwed on the end of the bolt to permit a full throw of the solenoid plunger 26 without forcing the bell-crank to move a corresponding amount. Suitable electric connections (not shown) are provided for operating the solenoid at the will of the operator.

The U-shaped support 18 to which the spray gun is fastened is mounted on the frame 10 for movement bodily in three planes at right angles to each other and for movement about the end of the nozzle, as a center, in two planes at right angles to each other by means of a series of members 34, 36, 38 and 40. The member 34 consists of a flat plate adjustably secured to the frame 10 by means of a slot-and-screw connection 42, 44. This permits movement of the spray gun to and from the surface of the insole adjacent to the feed rolls. Since the discharge from the spray gun is conical or fan-shaped, movement of the spray gun to or from the surface of the sole provides means for varying the width of the band of adhesive. The member 36 comprises an elongate block 46 having at one end a head 48 disposed in a horizontal plane, the elongate block having a groove 50 therein which slidably co-operates with a tongue 52 formed on the plate 34. The elongate block 46 is adjustably fastened to the plate by means of a screw 56 passing through a slot 54. This arrangement permits movement of the spray gun vertically, that is, widthwise of the insole. The upper face of the head 48 is provided with a groove 58 for the reception of a tongue 60 which is formed on the under side of the member 38, the groove 58 running in a direction at right angles to the plane of the plate 34. The member 38, which comprises a second flat plate, is connected to the head 48 by a slot-and-screw connection 59, 61, thereby permitting movement of the spray gun lengthwise of the insole. The upper surface of the member 38 is provided with an arcuate tongue 62 which co-operates with an arcuate groove 64 formed in the lower surface of the member 40, the latter being fastened to the member 38 by means of a slot-and-screw connection 66, 68. The center of the arc of the tongue 62 lies on a line running through the end of the nozzle of the spray gun G normal to the plane of the plate 38, so that adjustment of the member 40 with respect to the member 38 turns the spray gun horizontally about the end of its nozzle, as a center. This permits changing the direction of the sprayed adhesive so that it will clear the feed rolls without changing the distance between the end of the spray gun and the insole, as illustrated by the dot and dash lines in Fig. 5. An upstanding portion 70 is formed on the member 40 and is provided with an arcuate groove 72 which receives a tongue 74 formed on the lower end of an extension 76 projecting downwardly from the U-shaped support 18. A slot-and-screw connection 78, 80 is provided for fastening the extension 76 to the upright portion 70 of the member 40. The center of the arc of the groove 72 also lies on a line running through the end of the nozzle of the spray gun normal to the plane of the upright portion 70 so that adjustment of the extension 76 with respect to the upright portion 70 moves the spray gun in a vertical plane about the end of its nozzle, as a center, thereby changing the direction of the sprayed adhesive, as indicated by the dot and dash lines in Fig. 4, so that the band of adhesive may be shifted to coat a greater width on one side of the corner between the lip and channel than on the other, if desirable. The members 34, 36, 38 and 40 are provided with adjacent indicating marks to facilitate accurate adjustment of the parts relative to each other and to enable duplicating the setting of the spray gun when desirable.

In using the machine, a piece of work is mounted between the rolls and the spray gun is moved bodily and also about the end of its nozzle, as a center, in order to bring the nozzle into the proper position, by adjusting the various supporting members relative to each other. When the spray gun has been properly located, the operator will insert an insole with one end of its lip between the feed rolls. The machine automatically traverses the insole from end to end of the lip, whereupon the insole is removed from the machine. The spray gun is actuated by means of the solenoid only during the movement of the insole so as to apply a uniform coating to the insole.

Having described my invention, what I claim as new and desire to secure by Letters Patent of the United States is:

1. In a machine for applying a coating of adhesive to the lip and channel of an insole, means for moving the insole lengthwise along a predetermined path, a spray gun mounted adjacent to the path of movement of the insole, said spray gun having a nozzle, and means for adjustably supporting said spray gun for movement about the end of its nozzle as a center in a plurality of planes at right angles to each other.

2. In a shoe part coating machine, a spray gun having a nozzle, and a support for said spray gun, said support being constructed and arranged to permit adjustment of said spray gun about its nozzle as a center in a plurality of planes at right angles to each other.

3. In a machine for applying a band of adhesive to a shoe part, means for moving a piece of work in a predetermined path, a spray gun having a nozzle disposed with its end at a predetermined distance from the path of movement of the work, and an adjustable support for the spray gun, said support being constructed and arranged to permit tilting the spray gun about the end of its nozzle in planes at right angles to each other to vary the direction of application without disturbing the initial predetermined distance between the end of the nozzle and the work.

4. In a machine for applying adhesive to an insole, means for feeding the insole peripherally, a spray gun having a nozzle, and means for mounting said spray gun with its nozzle adjacent to the plane of movement of the insole, said means being adjustable to tilt the spray gun about the end of its nozzle as a center in planes at right angles to each other and being adjustable bodily to displace said spray gun rectilinearly in a direction lengthwise of the insole and parallel thereto.

5. In a machine for applying adhesive to an insole, means for feeding the insole peripherally, a spray gun having a nozzle, and means for mounting said spray gun with its nozzle adjacent to the plane of movement of the insole, said means being adjustable to tilt the spray gun about the end of its nozzle as a center in planes at right angles to each other and being adjustable bodily to displace said spray gun rectilinearly in a direction widthwise of the insole and parallel thereto.

6. In a machine for applying adhesive to an insole, means for feeding the insole peripherally, a spray gun having a nozzle, and means for mounting said spray gun with its nozzle adjacent to the plane of movement of the insole, said means being adjustable to tilt the spray gun about the end of its nozzle as a center in planes at right angles to each other and being adjustable bodily to displace said spray gun rectilinearly in a direction to and from the insole and perpendicular to the surface thereof.

7. In a machine for applying adhesive to an insole, means for feeding the insole peripherally, a spray gun having a nozzle, and means for mounting said spray gun with its nozzle adjacent to the plane of movement of the insole, said means being adjustable to tilt the spray gun about the end of its nozzle as a center in planes at right angles to each other and being adjustable bodily to displace said spray gun rectilinearly in directions lengthwise and widthwise of the insole in a plane parallel to the insole.

8. In a machine for applying adhesive to an insole, means for feeding the insole peripherally, a spray gun having a nozzle, and means for mounting said spray gun with its nozzle adjacent to the plane of movement of the insole, said means being adjustable to tilt the spray gun about the end of its nozzle as a center in planes at right angles to each other and being adjustable bodily to displace said spray gun rectilinearly in directions lengthwise and to and from the insole in planes at right angles to each other.

9. In a machine for applying adhesive to an insole, means for feeding the insole peripherally, a spray gun having a nozzle, and means for mounting said spray gun with its nozzle adjacent to the plane of movement of the insole, said means being adjustable to tilt the spray gun about the end of its nozzle as a center in planes at right angles to each other and being adjustable bodily to displace said spray gun rectilinearly in directions widthwise and to and from the insole in planes at right angles to each other.

10. In a shoe part coating machine, a spray gun having a nozzle, and a support for said spray gun, said support being adjustable to tilt the spray gun about the end of its nozzle as a center in planes at right angles to each other and being adjustable bodily to displace said spray gun rectilinearly in three planes at right angles to each other.

11. In a machine for progressively coating the margins of insoles, a pair of feed rolls for traversing the insole lengthwise, a spray gun having a nozzle disposed close to the path of movement of the insole opposite the delivery side of the feed rolls, and means for supporting said spray gun in the aforesaid position for movement about the end of its nozzle as a center in planes perpendicular to each other, said means being movable bodily to displace said spray gun rectilinearly in a direction crosswise of the insole, to and from the path of movement of the insole, and lengthwise of the insole.

12. In a machine for applying cement to a preset lip and inside channel of an insole, cooperating superposed rolls for feeding said insole, a spray gun having a nozzle, and means for mounting said spray gun with its nozzle disposed above the upper feed roll on a line extending downwardly and laterally of the rolls into the corner between the lip and channel, said mounting permitting movement of the spray gun about the end of its nozzle as a center in two directions at right angles to each other and being movable bodily to displace the spray gun rectilinearly in a direction parallel to the plane of the axes of the feed rolls and in directions normal to the plane of said axes.

13. In a machine for applying cement to a preset lip and inside channel of an insole, means for feeding said insole lengthwise, a spray gun having a nozzle, and means for mounting said spray gun with its nozzle at a predetermined distance from said feeding means and said insole, said mounting means comprising a plate mounted on said machine, said plate being movable in a direction at right angles to the plane of movement of the insole, a member adjustably mounted on said plate for vertical movement transversely of the width of the insole, a second plate mounted on said member for movement lengthwise of the insole, a bracket mounted for movement on said second plate in an arc, the center of the arc lying on a line normal thereto and passing through the end of the nozzle, and a support to which the spray gun is fastened, said support being adjustably mounted on said bracket for movement in an arc thereon, the center of the arc lying on a line normal thereto and passing through the end of the nozzle.

CHARLES C. BELL.